A. E. STENBERG.
LOCKING DEVICE FOR TRANSMISSIONS.
APPLICATION FILED JULY 17, 1919.
1,361,195.
Patented Dec. 7, 1920.
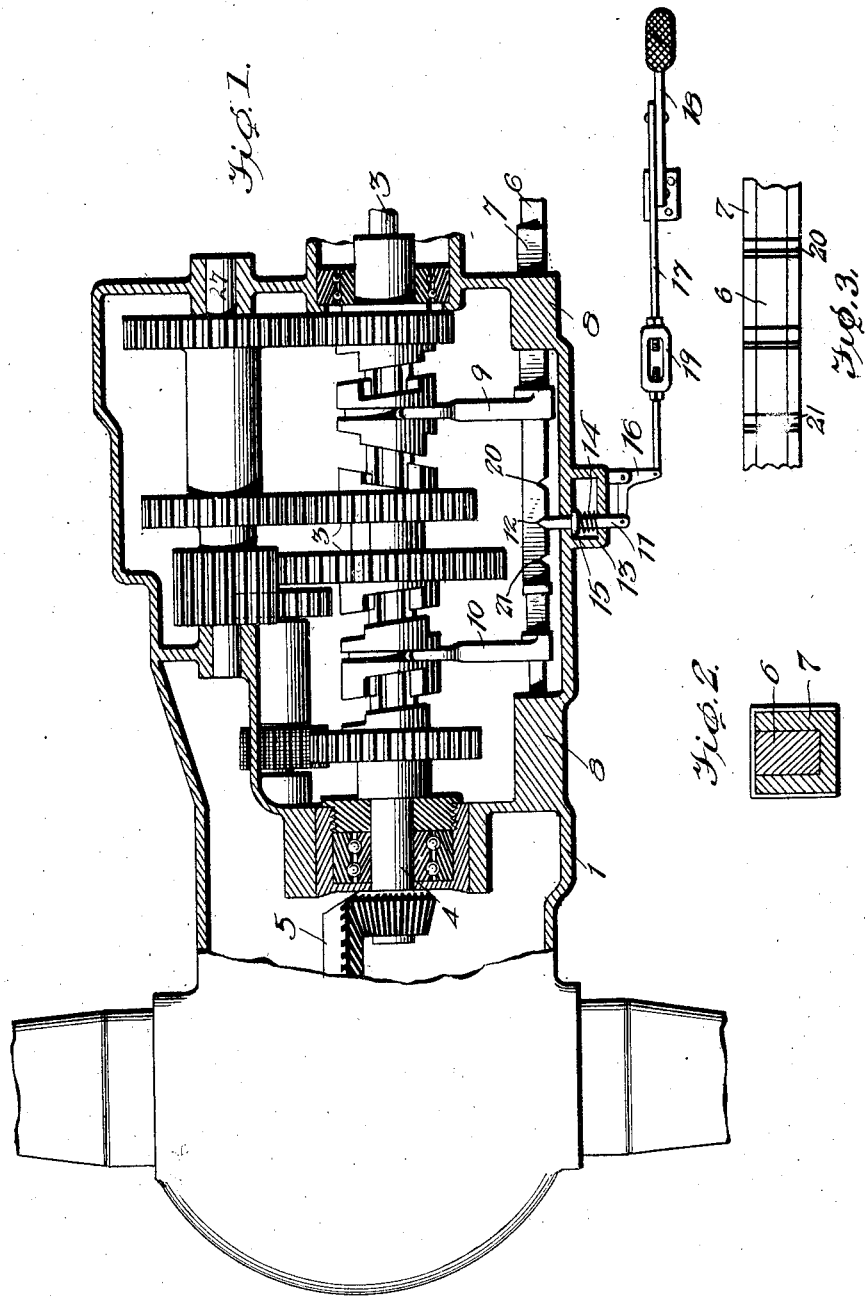
WITNESSES
INVENTOR
A. E. Stenberg,
BY
ATTORNEYS

UNITED STATES PATENT OFFICE.

ARVID EMMANUEL STENBERG, OF REED CITY, MICHIGAN.

LOCKING DEVICE FOR TRANSMISSIONS.

1,361,195.

Specification of Letters Patent.

Patented Dec. 7, 1920.

Application filed July 17, 1919. Serial No. 311,448.

*To all whom it may concern:*

Be it known that I, ARVID EMMANUEL STENBERG, a citizen of the United States, and a resident of Reed City, in the county of Osceola and State of Michigan, have invented certain new and useful Improvements in Locking Devices for Transmissions, of which the following is a specification.

My invention is an improvement in locking devices for transmissions, and has for its object to provide a simple, inexpensive and efficient means for locking the transmission forming the subject matter of my prior application, Serial No. 235,707, filed May 20, 1918.

In the drawings:

Figure 1 is a sectional view through the transmission with the locking mechanism in place.

Fig. 2 is a section through the controlling members of the transmission.

Fig. 3 is a top plan view of a portion of the controlling member.

The transmission forming the subject matter of the above application is arranged within a housing 1 of suitable construction, and the said transmission which is indicated generally at 2 is arranged between the driving shaft 3 and the driven shaft 4, the driven shaft being geared to the central gear 5 of the differential. By means of the transmission the driving shaft may be connected to the driven shaft either directly or at reduced speeds, or indirectly, by reverse mechanism as may be desired.

The transmission is controlled by a rod and sleeve 6 and 7, both of which are mounted to move longitudinally in bearings 8 in the transmission case, the said rod and sleeve being connected with the usual controlling lever, and this sleeve and rod have each a lateral arm 9 and 10, respectively, which are connected with the clutches of the transmission.

The locking mechanism for the transmission coöperates with both rod and sleeve, and it will be noticed, referring to Fig. 2, that the rod, which is rectangular in cross section, moves in a channel in the sleeve, said channel being of similar cross section. The locking mechanism comprises a bolt 11 which is movable radially toward the rod and sleeve and which has a pointed end for engaging notches or recesses 20 and 21 formed in the rod and in the sleeve and adapted to register in certain positions of the rod and sleeve. This bolt is mounted to slide in an auxiliary casing 13, and a coil spring 14 is arranged between the outer wall of the auxiliary casing and a stop 15 on the bolt, the spring acting normally to move the bolt into engagement with the notches of the rod. As shown, the parts are locked in neutral position.

It will be understood that both rod and sleeve have notches 12, 20 and 21, and as shown in Fig. 3 the corresponding notches are in register, the notch 12 of the sleeve being in register with the notch 12 of the rod. When the sleeve is moved in either direction to actuate a clutch, the rod being held, the notches 20 and 21 of the sleeve will be brought into register with the notch 12 of the rod. Conversely, when the rod is moved in either direction, with the sleeve held, a notch 20 or 21 of the rod will be brought into register with the notch 12 of the sleeve. The bolt is a common lock for both rods and sleeve.

When the bolt is released from the central notch, and the shifting fork 9 is moved into the intermediate position the notch 20 of the sleeve will be in line with the neutral notch of the rod. When the fork is moved into high speed it will bring the notch 21 on the sleeve to the neutral notch 12 of the rod.

An elbow lever 16 is pivoted to the auxiliary casing and one of the arms thereof is pivoted to the outer end of the bolt. The other arm is connected by a link 17 with the clutch controlling treadle 18 which is mounted in the usual maner. A turnbuckle 19 is interposed in the length of the link 17 for permitting its effective length to be varied.

In operation, to release the lock it is only necessary to press the treadle forwardly. This swings the elbow lever and moves the bolt outwardly. As soon as the bolt is released, it will move into engagement with the link, ready to engage another notch.

It will be observed that the shaft has three notches 12 for engagement by the bolt, to lock the rod with the transmisison in neutral, low or reverse. The treadle 18 is the clutch controlling treadle, and the arrangement is such that the clutch must be released before the transmission may be operated to shift the gears. The release of the clutch also releases the shaft 6 and the sleeve 7.

I claim:—

In a transmission, the combination of means for controlling the same comprising, a rod and a sleeve mounted to slide with respect to each other, said sleeve being cut away at one side to the level of the rod and said rod and sleeve having transverse notches at the cut-away side adapted to register, a bolt mounted to slide toward and from the rod and sleeve for engaging the notches when in register to lock said rod and sleeve, a spring normally pressing the bolt in engaging position and connection between the bolt and clutch operating means for releasing said bolt.

ARVID EMMANUEL STENBERG.

Witnesses:
A. M. FLEISCHHAUER,
LUTHER C. RIGGS.